Aug. 16, 1966        L. H. RUPLE        3,266,703

SEAM GUIDE ASSEMBLY FOR TUBE MILLS

Filed Aug. 18, 1964        3 Sheets-Sheet 3

INVENTOR.
LEWIS H. RUPLE
BY
Fraser & Fraser
ATTORNEYS

United States Patent Office 3,266,703
Patented August 16, 1966

3,266,703
SEAM GUIDE ASSEMBLY FOR TUBE MILLS
Lewis H. Ruple, Perrysburg, Ohio, assignor to Abbey Etna Machine Company, Perrysburg, Ohio, a corporation of Ohio
Filed Aug. 18, 1964, Ser. No. 390,330
5 Claims. (Cl. 228—49)

This invention relates to tube mills but more particularly to seam guide devices of the type adapted to be disposed between the fin roll pass and the welding station.

To achieve satisfactory welding of the seams of metallic tubes, it is of great importance that the tube be progressively advanced to the welding unit so that the free edge tube portions are not only in close juxtaposition to minimize the gap but also are aligned with each other instead of being arranged with one edge above the other. Thus after the metallic ribbon has been shaped into a generally tubular form by advancing through successive roll passes, the final forming of the tube just prior to the welding station is critical for achieving uniform, strong and leakproof welded seams.

This invention copes with the problem discussed above by producing a seam guide assembly engaged by the tubing between the fin roll pass and the welder and insures that the edge portions of the tubing are properly arranged for efficient welding, the assembly having features of adjustment enabling the same to be lengthened or shortened and/or to be rocked in order to take care of exigencies in an efficient manner as they occur and without shutting down the tube mill.

Another object of the invention is to produce a seam guide assembly for guiding the tube to welded in such manner that buckling of the tube is prevented and the free edge portions of the tube are properly arranged at the welding station.

Other objects and advantages of the invention will hereinafter appear and, for purposes of illustration but not of limitation, an embodiment of the invention is shown on the accompanying drawings, in which FIGURE 1 is a side elevation of a seam guide assembly for tube mills, portions of the frame being shown in fragment, the fin rolls, welder and final pressure rolls being shown by broken lines;

Figure 1:
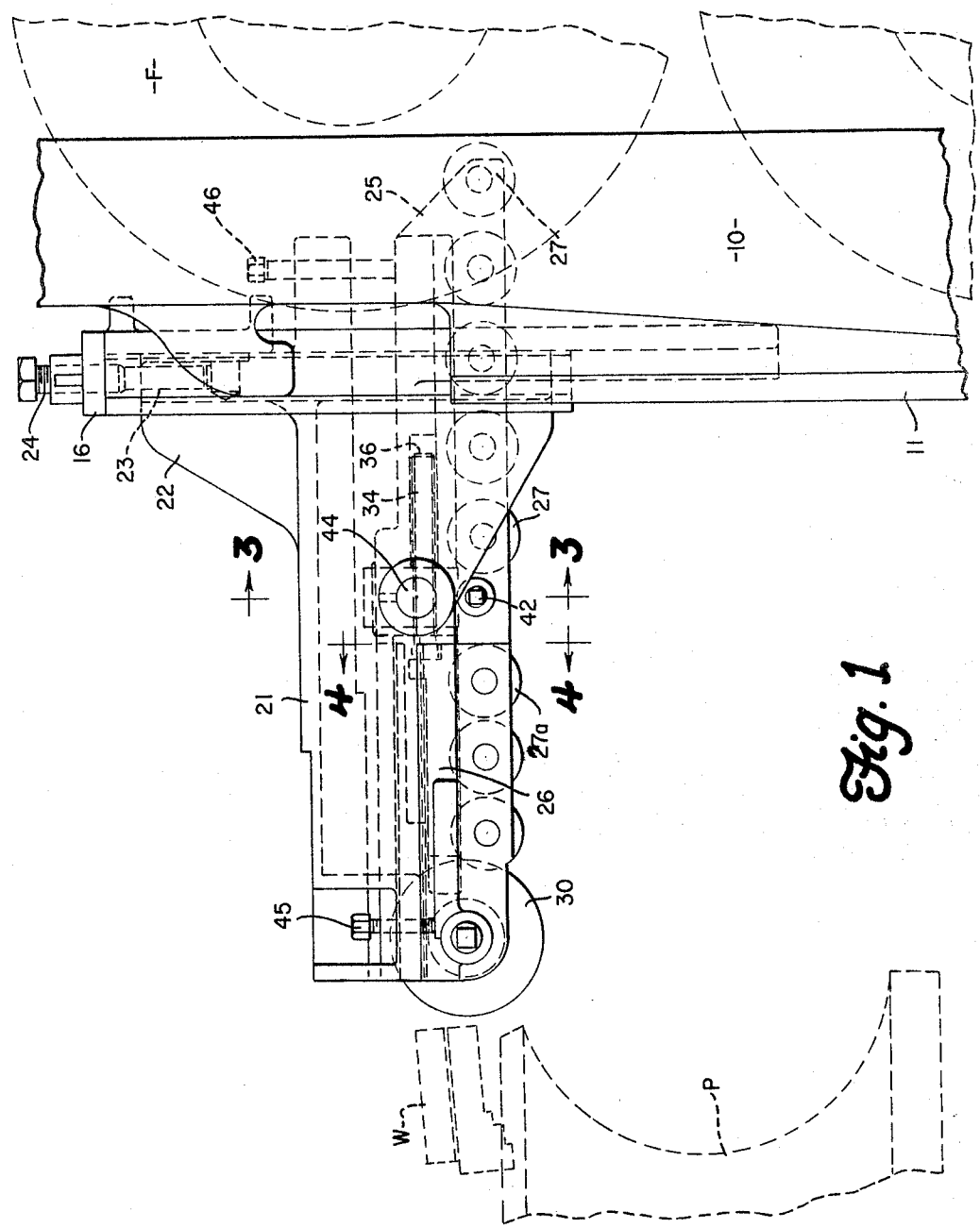

The illustrated embodiment comprises a seam guide assembly for tube mills and comprises laterally spaced upright frame members 10, to which are applied upright supporting plates 11 connected to the frame members 10 by a series of stud bolts 12. It will be observed that the inner edge portions of the plates 11 extend inwardly beyond the frame members 10. On the inner vertical edge of each of the plates 11 is a vertical series of closely spaced holes 13 to receive bolts 18 for adjustably securing a U-shaped supporting frame 14. The frame 14 includes a pair of laterally spaced parallel uprights 15 and a cross member 16 at the upper end. The spaced parallel uprights 15 each have a pair of depending lateral extensions 17 which are secured to the supporting plates 11 by bolts 18 extending through the holes 13. Disposed between the uprights 15 is a rigid backplate 19, which extends to vertical guides in the uprights 15, stud bolts 20 adjustably securing the plate 19 in position.

Integral with the rigid backplate 19 is a seam guide housing 21, which projects forwardly therefrom in a horizontal manner. Integral with the intermediate portion of the housing 21 is an upwardly extending rib 22, which has a vertically disposed threaded socket 23 to receive an adjusting bolt 24 extending down from the cross frame member so that the seam guide housing 21 and associated parts can be raised or lowered to accommodate different size tubes, as will hereinafter more fully appear.

The seam guide housing 21 is of generally inverted U-shaped and, as shown on FIGURE 1, it extends well into the fin roll pass F and at the front end terminates close to the welding unit W and its associated pressure rolls P (only one of which is indicated on the drawing). The seam guide unit is carried by the housing 21 and comprises two horizontally aligned sections, an aft section 25 and a fore section 26. The fore seam guide section 26 is slidably adjustable forwardly and rearwardly relative to the aft section 25. As shown, the section 25 has a pair of laterally spaced depending parallel brackets carrying a series of rollers 27. It should be noted particularly that the rearmost of the rollers 27 extends well into the fin roll F. In the form shown the aft guide seam section 25 is provided with a series of five rollers 27, which are equidistantly spaced and arranged in parallel relationship. The fore seam guide section 26 has laterally spaced depending bracket plates 28 and 29 and between these plates are disposed rolls 27a which are rotatable on pins 30. A shown, three such rolls are on the seam guide 26. The rolls 27 and 27a are identical and each is narrow at the central portion from which the walls flare laterally and outwardly.

Figure 2:
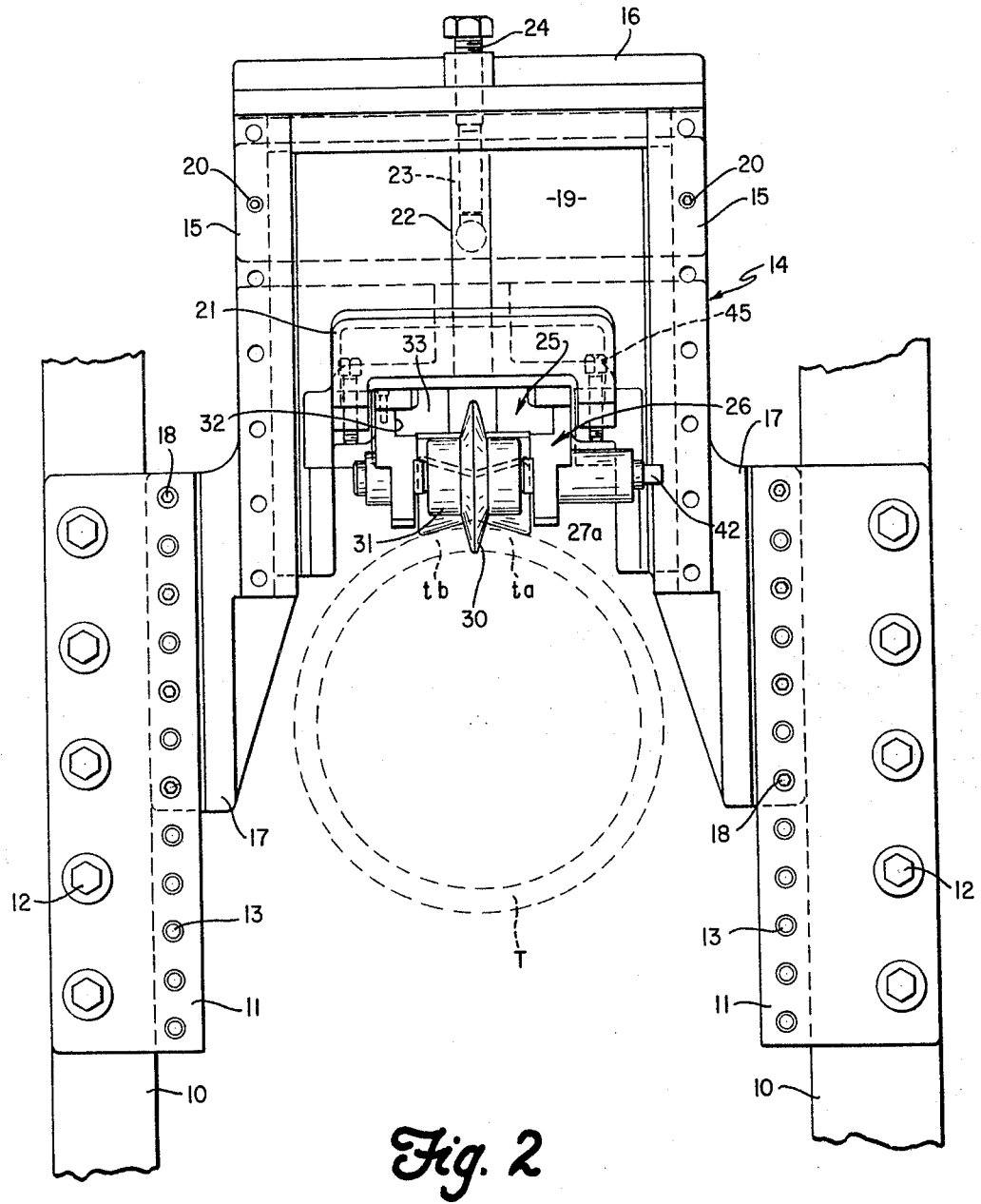
FIGURE 2 is a front end elevation of the seam quide assembly, parts of the frame being broken away.

In operation as the tube T which is formed progressively from a metal ribbon passes the seam guide assembly, the rolls 27 and 27a impose pressure on the tube, as indicated in FIGURE 2, causing the as yet unwelded free edge portions $t_a$ and $t_b$ to move toward each other so that they are uniformly aligned and properly spaced preparatory for the welding operation. At the front end of the seam guide section 26 is a disc roll 30 which has a sharp peripheral edge, on opposite sides of which the disc flares outwardly. On opposite sides of the disc are cylindrical side portions 31. The disc roller assists in positioning the edge portions of the tube for welding operation.

In the top portion of the fore section 26 of the seam guide is a horizontal guideway 32, which fits over a forward extension 33 (T-shaped in section) of the aft seam guide section 25. The fore section 26 may be adjusted forwardly and rearwardly with respect to the rear or aft seam guide section 25. This adjustment is accomplished manually by a screw-threaded horizontally disposed rod 34, the forward end of which is suitably anchored by a plate 35 to the rear end of the fore seam guide section 26, the rear end of the rod 34 being shiftable to and fro with a socket 36.

Figure 3:
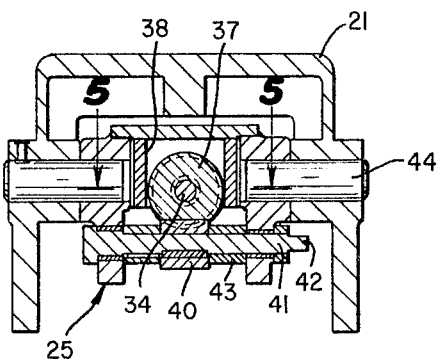
FIGURE 3 is a vertical sectional elevation on the line 3—3 of FIGURE 1.
Figure 4:
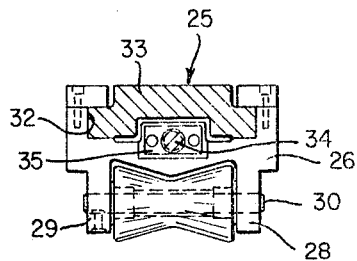
FIGURE 4 is a vertical sectional elevation substantially on the line 4—4 of FIGURE 1.
Figure 5:
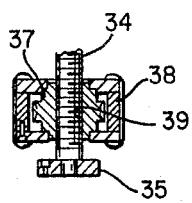
FIGURE 5 is a sectional view substantially on the line 5—5 of FIGURE 3.

For effecting movement of the rod 34, a worm wheel 37 is retained against axial movement by a cage 38, which forms part of the aft section 25. The worm wheel is provided with a screw-threaded bore 39, with which the rod 34 screw-threadedly engages. Engageable with the worm wheel 37 is a worm 40 (FIG. 3) which is fixed to an operating shaft 41 having an outside accessible wrench-receiving head 42. Suitable bearings and spacers 43 are provided for the shaft 41 in the aft section 25.

From the above description it will understood that by turning the shaft 41 in one direction or the other by the worm 40 and worm wheel 37, the screw-threaded rod 34 is caused to shift longitudinally in one direction or the other, thereby causing the fore seam guide section 26 to move horizontally in one direction or the other, as desired. The worm and wheel cooperate to provide a lock for securing the rod 34 in its position of adjustment. These adjustments for the fore seam guide section 26 can be effected during the operation of the tube mill so that it is not necessary for the tube mill to be shut down in order to regulate the overall length of the seam guide assembly and thus ensure that an adequate length of the advancing tube T is engaged by the rolls.

The seam guide assembly may also be adjusted to compensate for longitudinal inclination of the advancing tube T so that in such event the rollers will properly engage the advancing tube. For this purpose and as particularly shown on FIGURE 3, a pair of axially aligned pivot pins 44 arranged approximately centrally of the seam guide 44 enable rocking movement of the seam guide assembly about a horizontal axis. The pins 44 extend respectively through registering holes in the seam guide housing 21 and the aft section 25. Manifestly, by so mounting the assembly, the ends thereof may tilt or rock upwardly or downwardly.

To enable the tilting adjustment to be accomplished and to lock the seam guide assembly in its adjusted position, a pair of vertical adjusting screws 45 are disposed at the front end of the unit and similar adjusting screws 46 are disposed at the rear of the unit. These screws extend respectively through portions of the guide housing 21 and are adapted to engage suitable pads on the seam guide sections. Thus, by loosening certain of these screws and tightening others the proper degree of inclination of the seam guide may be readily effected.

From the above description it will be apparent that I have provided a simple and rugged seam guide assembly by which greater or lesser lengths of the advancing tube may be engaged by the rollers. Such length adjustment of the seam guide can be readily and conveniently effected while the tube mill is in operation. Additionally, in order to accommodate tubes of different sizes it is necessary that the entire seam guide unit be raised or lowered and this can be achieved by releasing the stud bolts 20 and operating the adjusting screw 24. Finally, adjustment also can be made to take care and accommodate different inclinations of the advancing tube and this is accomplished by adjusting the screws 45 and 46 and effecting a tilting of the entire unit. By virtue of these several adjustments the tube T can be guided to the welding unit so that the free edge portions of the tube indicated at $t_a$ and $t_b$ are properly positioned to the welder W for efficiently securing the desired weld.

Numerous changes in details of construction, arrangement and operation may be effected without departing from the spirit of the invention, especially as defined in the appended claims.

What I claim is:

1. In a tube mill in which a metal ribbon is gradually formed into a tube and the edges thereof are seam welded and in which the final forming is effected by a series of fin roll passes which are spaced from each other and arranged adjacent the welded, the improvement comprising a seam guide assembly for the metal ribbon disposed between the last fin roll pass and the welding point and including a series of spaced rollers along which the edge portions of the tube travel, and means for longitudinally extending or retracting a portion of the assembly for ensuring that an adequate length of the tubing is engaged by the assembly.

2. In the organization as claimed in claim 1 in which the seam guide assembly comprises a pair of relatively shiftable sections, and means for effecting such shifting movement.

3. In the organization as claimed in claim 2 in which the shifting means includes a worm and wheel operative with respect to one section, said wheel having a screw-threaded bore, and a screw-threaded rod engaging said bore and anchored at one end to the other section.

4. In the organization as claimed in claim 2 wherein said means for effecting shifting movement includes means operable from the outside for effecting relative elongation or retraction of the seam guide sections, and a mounting for said assembly affording tilting thereof to accommodate longitudinal inclination of the tube.

5. The organization as claimed in claim 4 comprising means for bodily raising and lowering the seam guide assembly to accommodate different diameter tubes.

References Cited by the Examiner

UNITED STATES PATENTS

| 2,052,380 | 8/1936 | Chapman | 219—59 |
| 2,245,769 | 6/1941 | Flamm | 280—11.26 |
| 3,170,427 | 2/1965 | Ruple et al. | 228—49 |

FOREIGN PATENTS

| 1,114,737 | 12/1955 | France. | |

CHARLES W. LANHAM, *Primary Examiner.*

R. J. HERBST, *Assistant Examiner.*